Figure 1:
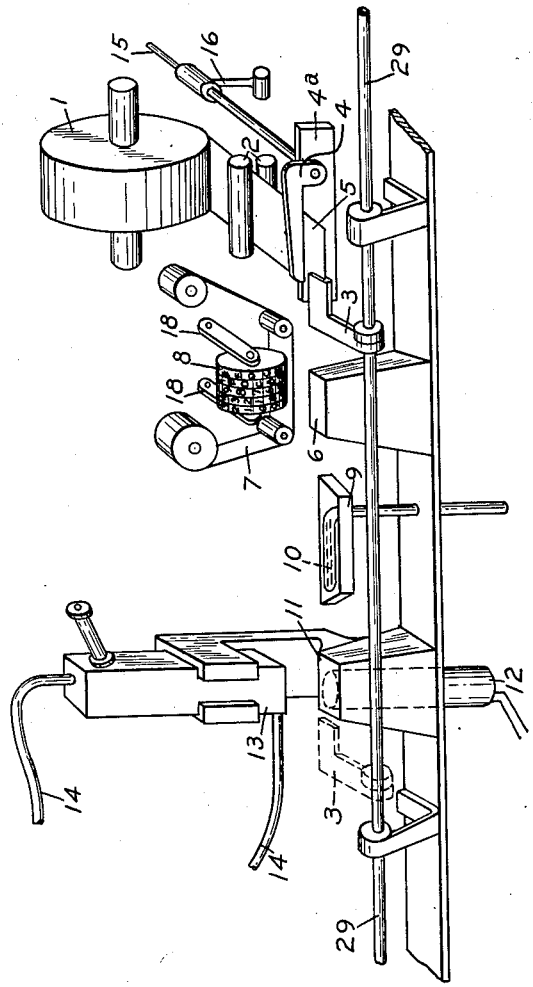

Oct. 6, 1953   H. MEYER   2,654,495
MACHINE FOR MARKING AND AFFIXING TABS TO ARTICLES
Filed Feb. 27, 1950   2 Sheets-Sheet 1

INVENTOR
HANS MEYER
BY *Wendroth, Lind & Ponack*
ATTORNEYS

Oct. 6, 1953　　　　　H. MEYER　　　　　2,654,495
MACHINE FOR MARKING AND AFFIXING TABS TO ARTICLES
Filed Feb. 27, 1950　　　　　　　　　　　　　　2 Sheets-Sheet 2
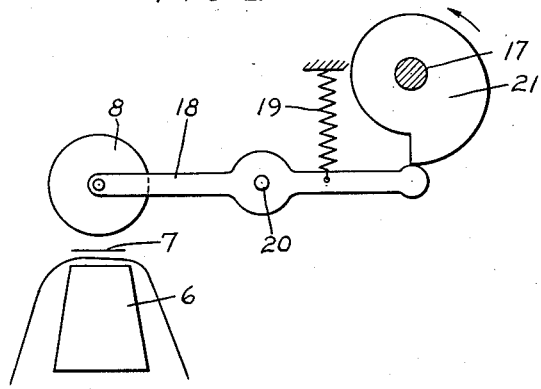
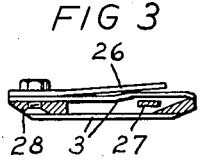
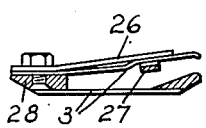
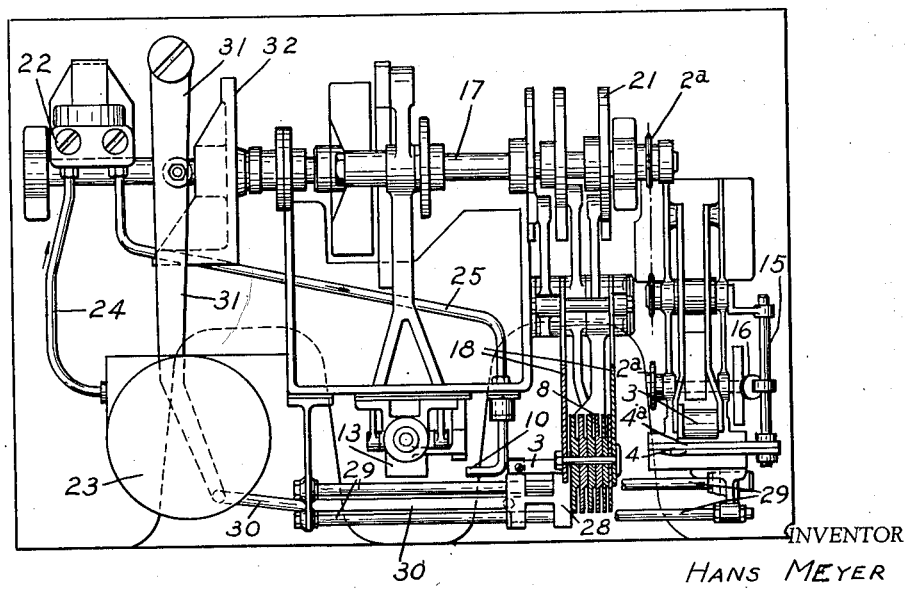
INVENTOR
HANS MEYER
BY Wenderoth, Lind & Ponack
ATTORNEYS Patented Oct. 6, 1953

2,654,495

UNITED STATES PATENT OFFICE 2,654,495

MACHINE FOR MARKING AND AFFIXING TABS TO ARTICLES

Hans Meyer, Surrey, England

Application February 27, 1950, Serial No. 146,451
In Great Britain March 4, 1948

3 Claims. (Cl. 216—2)

This invention relates to the affixing of tabs, containing or consisting of thermoplastic material, to articles, especially textile articles, by heat and pressure, each such tab being easily removable (when no longer required) by using part of the tab, left unaffixed, as a finger piece by which to tear it off. The chief object of the present invention is to provide a machine for enabling such tabs to be applied mechanically in rapid succession.

According to the present invention a tab-making, tab-marking and tab-applying machine is provided comprising means for severing a strip or tape comprising or carrying thermoplastic material into successive tabs, means for marking each tab, means for applying heat and pressure to each tab, and means for presenting each tab first to the aforesaid marking means and then to the heat and pressure applying means in conjunction with the article to be marked so that the tab becomes adherent to the article. If each tab is such that a portion thereof (serving as an eventual finger piece) is devoid of thermoplastic material it is immaterial whether the whole tab is subjected to the heat and pressure, but if each tab as a whole comprises or carries thermoplastic material a portion of each such tab is preserved as a finger piece by being kept free from the heat and pressure.

According to one embodiment of the machine as hereinafter more fully described a portion of each tab as it is produced by severance from the tape or strip material is gripped by gripping means which travel to present the tab in succession to the marking means then to means for applying a solvent for the thermoplastic material in or on the tab, and finally into position between pressure applying platens ready for adhesion to a garment or the like, whereupon the gripping members release their grip, leaving the formerly gripped portion of the tab to serve as a finger piece, and themselves return to grip the next tab. The various means may be arranged side by side so that a straight line reciprocating movement of the grippers enables them to present each tab to the successive means.

The means for sub-dividing the tape into tabs may conveniently be a guillotine; the solvent applying means may conveniently be an intermittent spraying means, and the heat and pressure applying means may conveniently be a stationary platen co-operating with a reciprocating platen. The heat required to render the thermoplastic component in the tabs adhesive may be applied to one of the platens while the other platen remains cold or is positively cooled as hereinafter described. The heating of the one platen may be effected in any convenient way as for example by ohmic resistance elements or by high frequency diathermic heating means.

The tab material may be that known under the Registered Trade-Mark "Cellophane," or may consist of fabric, paper, fibre glass or the like, having on one side a coating of thermoplastic material, or to which thermoplastic material has been applied as a preformed film, or the material may comprise a suitable fabric composed at least in part of filaments or yarns of a thermoplastic material.

The means for carrying out the various operations may be embodied as components of a single machine as hereinafter described.

In order that the invention may be clearly understood and readily carried into effect the same will now be described with reference to the accompanying drawings in which Figure 1 illustrates somewhat diagrammatically one arrangement of parts of a machine embodying the various features of the invention. Figure 2 is a view of means for operating the marking means. Figures 3 and 4 are detail views of the tab-gripping means. Figure 5 is a plan view of a complete machine.

The reference numeral 1 indicates a reel of prepared tape which passes between feed rollers 2 operating in any conventional manner as by sprocket chain and wheels 2ª from the main drive shaft 17 (Fig. 5) to deliver the free end of the tape step by step to grippers 3. The tape is cut transversely by a guillotine 4, 4ª into a succession of tabs 5 of appropriate width whereupon the grippers are moved to present the tab over a marking platform or anvil 6. One embodiment of guillotine-actuating mechanism is illustrated by way of example in Figure 1 in which the movable cutter blade 4 is rocked relatively to the stationary plate 4ª by a rock shaft 15 having fixed thereto an arm 16 which bears against a rotary cam (not shown) actuated from the main drive shaft 17 (Fig. 5) of the machine. In this position each tab is stamped with appropriate numerals, letters, or other indications by a suitable printing, perforating or embossing device such for example as that shown comprising a marking ribbon 7 and typewheels 8. One embodiment of operating mechanism for the printing device is illustrated by way of example in Figure 2 in which the arms 18 carrying the type wheels 8 are part of a frame controlled by a spring 19 and rockably mounted on a shaft 20 so as to be rocked by a rotary snail cam 21 shaped to cause the type wheels to strike the tab through the marking ribbon 7 each time a tab with fabric to be labelled is placed over the anvil 6. The grippers then again move to transport the tab into position under or over a solvent-applying device such as the platform 9 having a spraying tube 10, from which the solvent is sprayed at the correct intervals by the operation of a pump 22 (Fig. 5) operated by a cam on the main drive shaft 17. The solvent is stored in a reservoir 23 and drawn therefrom by the pump through a pipe 24 and delivered from the pump by the pipe 25 to the said spray tube 10.

Finally the grippers again transport the tab into position with respect to the heat and pressure device, one embodiment of which is shown as comprising a stationary lower platen or anvil 11 heated electrically by an element 12, under thermostatic control, and a reciprocatory hollow platen 13 actuated from the main drive shaft 17 by toggle mechanism, levers, eccentrics or the like and kept cold by circulation of cold water through pipes 14 to prevent the tabs from sticking to it. Means may be provided for regulating the pressure applied by the platen 13 and the duration of the pressure, the degree of pressure being say from 40 to 100 lbs. per square inch. Before the heat and pressure are applied, the grippers release the tab and are returned to their initial psition to take the next tab.

One embodiment of the grippers is illustrated in Figures 3 and 4, the jaws being shown closed in Figure 3 under pressure of a blade spring 26 and open in Figure 4 owing to the upward pressure of a lifting finger 27. The travel of the grippers 3 mounted on a carriage 28 (Fig. 5) slidable on a pair of parallel horizontal guide rods 29 (Figs. 1 and 5) is effected in any convenient manner as by the mechanism shown in Figure 5 comprising a link 30 pivoted at one end to the gripper carriage and pivoted at the other end to a lever 31 rocked from the main shaft 17 of the machine by means of a cam 32 suitably shaped to give the required intermittent forward movement and rest periods to the grippers (to the left in Figure 1) and a steady return movement. In order to open and close the grippers at the required times—namely at the extreme right hand end of their travel in Figure 1 so as to seize the nearest side edge of the severed piece of tape 5, Fig. 1, (constituting the leading end of each tab) and again at the extreme left hand end of their travel to release the tab as the platen 13 descends—the abovementioned lifting finger 27 is momentarily moved upwardly by any suitable means not shown, said finger piece being rockably mounted on the gripper carriage 28 to permit of such movement.

It will of course be understood that each article to be labelled is placed on the lower platen before the grippers place a tab in position above it.

If the tabs are to be affixed to articles which are to be laundered, and the thermoplastic material be such as not to be softened at the temperature of boiling water, the temperature of the heated platen will be well above 100° C. but below the scorching point of materials which are easily affected by heat, for example artificial silk, and in such case the temperature of the heated platen may be between 115° C. and 175° C. If the tabs are to be affixed to articles not normally subjected to laundering whilst they carry the tab, the temperature of the heated platen may be considerably lower, for example between 65° C. and 115° C.

What I claim is:

1. In a machine for affixing tabs to textile articles; in combination, a lower platen for supporting a textile article, a vertically movable upper platen in opposed relation thereto, a gripper having gripping jaws of extended area for engaging a tab in gripping relation over a substantial area of the opposite sides of one end thereof, a tab supply station, means at said station for presenting tabs in edgewise relation to the jaws of said gripper, means supporting said gripper for reciprocating movement along a predetermined path between said supply station and a position adjacent said platens in which said tab is positioned between said platens with the portion held by said gripper projecting outside the area subtended between the opposed surfaces of said platens, said gripper being releasable from said tab for return to said tab supply station after the movable platen is brought into engagement with the non-gripped portion of said tab.

2. A machine according to claim 1 wherein heating means is associated with one of said platens for supplying heat thereto.

3. In a machine for forming and affixing marking tabs to textile articles including a tab blank supply station, a printing station and an affixing station; in combination, a gripper having gripping jaws of extended area for engaging a tab blank over a substantial area of the opposite sides of one end thereof, means supporting said gripper for reciprocating movement along a predetermined path adjacent said several stations, means at said tab blank supply station for presenting tab blanks in edgewise relation to the jaws of said gripper, means at said printing station for engaging both sides of a tab blank carried by said gripper and applying a marking to the exposed upper surface of said blank when said gripper presents a tab blank at said printing station, a lower platen at said affixing station for supporting textile articles in tab-receiving position, a vertically movable upper platen in opposed relation to said lower platen, said gripper being movable along said predetermined path first to said printing station, then to said affixing station and then in a reverse direction along said path to said tab blank supply station, said gripper at said affixing station presenting the exposed and printed portion of said tab beneath and in registry with said movable upper platen, and said movable upper platen being movable downwardly past the end of said gripper in engagement with the printed side of said tab while the gripped end of said tab remains engaged with the jaws of said gripper, thereby insuring that said end remains free from adherence to the textile article.

HANS MEYER.

References Cited in the file of this patent

UNITED STATES PATENTS

| Number | Name | Date |
|---|---|---|
| 2,235,054 | Von Hofe | Mar. 18, 1941 |
| 2,279,724 | Von Hofe | Apr. 14, 1942 |
| 2,286,159 | Reynolds | June 9, 1942 |
| 2,338,887 | Von Hofe | Jan. 11, 1944 |
| 2,479,891 | Adshead | Aug. 23, 1949 |

FOREIGN PATENTS

| Number | Country | Date |
|---|---|---|
| 644,119 | Great Britain | Oct. 4, 1950 |